United States Patent [19]

Barker et al.

[11] Patent Number: 4,905,146

[45] Date of Patent: Feb. 27, 1990

[54] EXPLICIT SPECIFICATION OF VALID COMPOUND DOCUMENT DATA STREAM STRUCTURE AND CONTENT

[75] Inventors: Barbara A. Barker, Round Rock; Thomas R. Edel, Austin; Jeffrey A. Stark, Grapevine, all of Tex.

[73] Assignee: International Business Machines Corporation, Armonk, N.Y.

[21] Appl. No.: 197,878

[22] Filed: May 24, 1988

[51] Int. Cl.[4] ............................................. G06F 9/06
[52] U.S. Cl. .................................................. 364/300
[58] Field of Search ........................ 364/200, 300, 900

[56] References Cited

U.S. PATENT DOCUMENTS 4,723,211  2/1988  Barker et al. ..................... 364/300

Primary Examiner—Raulfe B. Zache
Attorney, Agent, or Firm—Whitham & Marhoefer

[57] ABSTRACT

A compound document data stream is verified to determine if a compound document conforms to a specified architecture function set. A table driven compound document verifier identifies each deviation from a specified function set in the compound document. The verifier can test the output of document generation and modification applications to determine if they are in compliance with the architecture and to identify those applications that do not comply and in what aspects they deviate from the architecture and its specified function set.

8 Claims, 4 Drawing Sheets

EXPLICIT SPECIFICATION OF VALID COMPOUND DOCUMENT DATA STREAM STRUCTURE AND CONTENT

CROSS-REFERENCE TO RELATED APPLICATION

This application is related in subject matter to application Ser. No. 07/165,333 filed Mar. 8, 1988, by the inventors named in this application and entitiled "Shell Structure for Management and Processing of Data Stream Constructs". That application is assigned to a common assignee with this application and its disclosure is incorporated herein by reference.

DESCRIPTION

Background of the Invention

1. Field of the Invention

The present invention generally relates to digital communications and, more particularly, to a revisable document architecture which allows the various data stream structures and content that are valid for a particular compound document to be explicitly specified in tabular form. The invention provides a way to verify a compound data stream to determine if a compound document conforms to a specified architecture function set.

2. Description of the Prior Art

The management of a data stream in a digital communications network, such as a local area network (LAN) or larger teleprocessing networks, presents many problems, particularly where the data streams generated at various terminals of workstations operating with a variety of application programs generate data streams which have different control characters and protocols. To better understand the problem, consider a hypothetical teleprocessing network supporting communications between two or more end users. The end users may be an application program, a storage device or an operator at a display terminal. Serving the end users are a set of communications functions dealing with the language, including formatting, translation and/or editing, dialogue discipline to control data flow, transmission control including flow rate control and sequence control, and transportation including passage of signals through a more or less complex transmission network between addressable units.

In traditional revisable document architecture, the structure of the data stream used to define a document and the content of that data stream and its organization is described in writing and, thus, the permitted data stream organizations and content are merely implied by the values specified by a function set parameter within the document data stream.

SUMMARY OF THE INVENTION

It is therefore an object of the present invention to provide a way to explicitly define the valid organizations and content for function sets and associate the definitions with one or more documents.

According to the invention, there are four parts which define (1) the data stream structure in terms of the permitted states that can appear in the data stream and the entities that may appear in each state, (2) the entities that may appear in each entity or the fact that an entity is atomic, i.e., a leaf node entity, (3) the attributes that may be declared by an entity, and (4) the values that may appear for an attribute. A tabular format is used to explicitly describe valid data stream organizations and content.

The invention contemplates a table driven compound document verifier that remains unmodified across any architecture changes, addition of new document processing products, function enhancements to existing products, modifications of existing function sets, and addition of new function sets. An application acting as a general purpose compound document data stream verifier can identify each deviation from a specified function set in a compound document. Further, a generalized application verifier can be written to test the output of document generation and modification applications to determine if they are in compliance with the architecture and to identify those applications that do not comply and in what aspects they deviated from the architecture and its specified function set.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF A PREFERRED EMBODIMENT OF THE INVENTION

Figure 1:
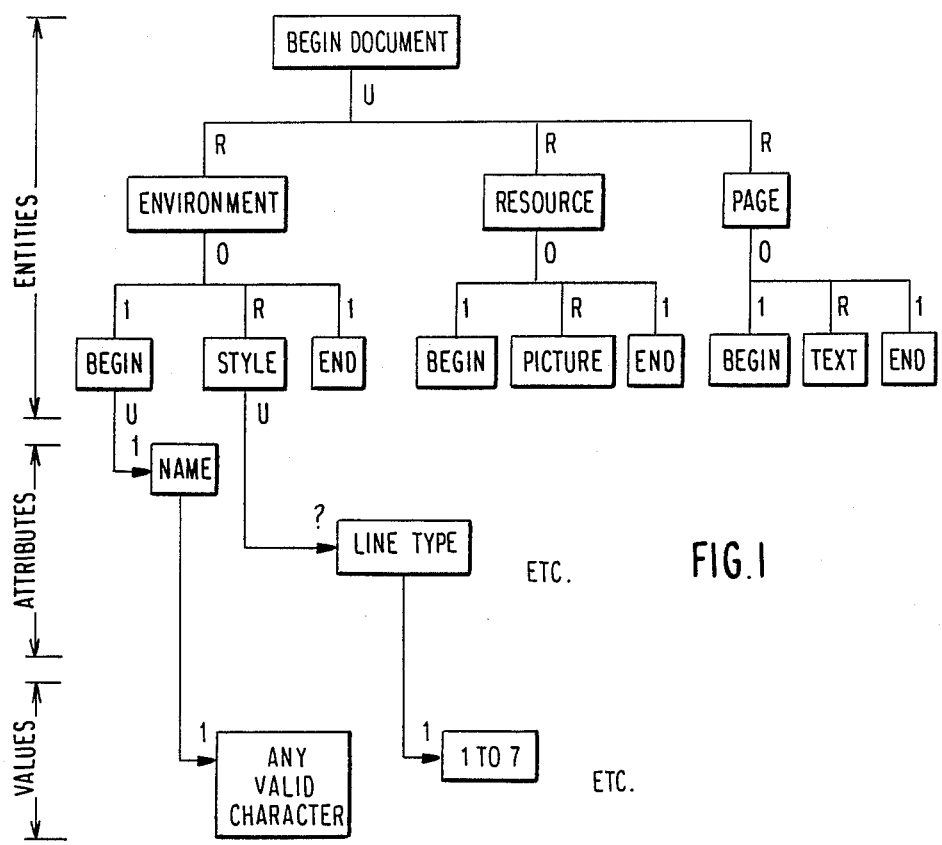
FIG. 1 is a block diagram illustrating a conceptual view of a compound document data stream description according to the invention.

Referring now to the drawings, and more particularly to FIG. 1, there is shown a conceptual view of a compound document data stream description. In the figure, the O, U, 1, R, and ? designations have the following meanings:

| Code | Meaning |
|------|---------|
| O | The referenced entities, attributes, or values must appear in the order specified. |
| U | The referenced entities, attributes, or values can appear in any order. |
| 1 | The entity, attribute, or value may only appear once in the referencing entity. |
| R | The entity, attribute, or value may appear more than once in the referencing entity. |
| ? | The entity, attribute, or value may not appear, but if it does, it may only appear once. |

Other codes would also exist to designate relationships such as the entity, attribute, or value may not appear or may appear one or more times, choose only one of the referenced entities, attributes, or values, and other codes as needed.

The actual encoding of a compound document data stream structure and content description is accomplished by linking together several elements to form a tabular description. An example is given in the following Table.

| Element | Description |
|---|---|
| Element 1 | <Document→Environment, Resource, Page; Any Order> |
| Element 2 | <Environment→Begin, Style, End; Specified Order> |
| Element 3 | <Resource→Begin, Picture, End; Specified Order> |
| Element 4 | <Page→Begin, Text, End; Specified Order> |
| Element 5 | <Begin→Name; Must Appear Once and Only Once> |
| Element 6 | <End> |
| Element 7 | <Style→Line_Type, . . . ; Appears One or More Times> |
| Element 8 | <Picture→ . . . ; Appears One or More Times> |
| Element 9 | <Name→Character String; Must Appear Once and Only Once> |

More complex relationships can be expressed using the mathematical notion of parentheses. For example, several entities appearing in any order any number of times can be expressed as:

Appears One or More Times (Choose One (Text, Picture))

When a compound document description is explicitly encoded, a table driven verification routine can unambiguously determine if a data stream is properly constructed for a specified compound document function set.

Figure 2:
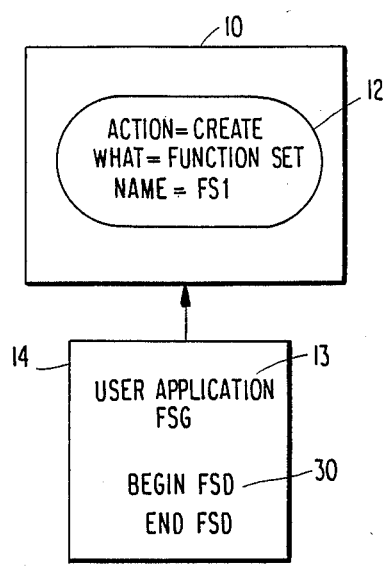
FIG. 2 is a block diagram illustrating a workstation having a screen on which there is displayed a function set definition menu.

To further the reader's understanding of the invention, reference is next made to FIG. 2 of the drawings. In this figure, there is illustrated a screen 10 on which is displayed a function set definition menu 12. The menu is presented by application 13 that is running in device 14, such as a computer terminal or workstation, and which has been initiated by an operator of device 14. The application allows for the definition of function set entities including collections of structured fields (document, master environment group, resource group, page, and so on) and single structured fields (Begin Document, Include Master Environment Group, Begin Master Environment Group, and so on). The application also allows for the definition of the permitted content of a structured field grouping which is in effect a list of each single structured field that can occur in the structured field group and the relationship between each structured field in the group (e.g., can appear in any order but one and only one time). For each single structured field, the application allows for the definition of the permitted content (attributes) which is in effect a list of each attribute that can occur in the single structured field and the relationship among those attributes in the single structured field. The application also allows for the definition of the permitted values of an attribute which is in effect a list of each value that can occur in the attribute. In FIG. 2, the operator has entered "Create" after the "ACTION=" prompt, "Function Set" after the "WHAT=" prompt, and "FS1" after the "NAME=" prompt. Therefore, application 13 starts a shell for a function set description table named "FS1" by automatically generating a Begin/End Function Set Description Table and displaying prompts on screen 10 whose answers will be used to complete the Function Set Description Table.

Figure 3:
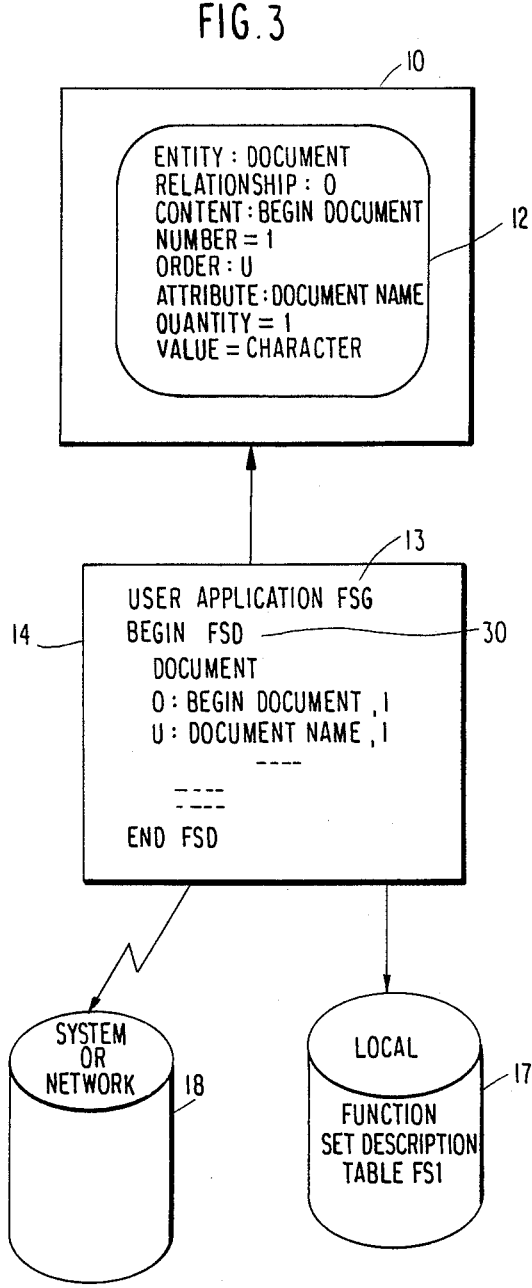
FIG. 3 is a block diagram illustrating the workstation of FIG. 2 showing prompts used to get information from the operator to fill in the function set description table.

FIG. 3 shows the prompts that are used to get information from the operator to fill in Function Set Description Table "FS1". In response to the prompt "ENTITY:", the operator selects "Document" thereby declaring the root entity to be "Document". Any known selection process will suffice. For purposes of this disclosure, it is assumed that the cursor can be placed on the response area and a function key can be used to cycle through the available choices. When the desired choice appears, the operator selects it by depressing a designated key on the keyboard, such as the ENTER key. The application recognizes "Document" as an entity which is composed of a structured field group and asks for the content relationship with the prompt "RELATIONSHIP:". The operator selects "O" which means the content must appear as entered. The application now prompts "CONTENT:", and the operator enters "Begin Document". The application recognizes "Begin Document" as a single structured field and prompts for the number of times it can appear with the prompt "NUMBER=". The operator enters "1" declaring that this structured field must appear but only one time in "Document". The application next prompts for attribute order with the prompt "ORDER:". The operator selects "U" declaring that the attributes can appear in any order within "Begin Document". The application then prompts for an attribute with the prompt "ATTRIBUTE:". The operator selects "Document Name". The application prompts for the number of times "Document Name" can appear in "Begin Document" with "QUANTITY=". The operator enters "1" declaring that "Document Name" must appear but only one time. The application then prompts for the "Document Name" value with the prompt "VALUE=". The operator enters "Character" declaring that "Document Name" may be composed out of any combination of coded graphic characters that are available on the code page that is in force when character name is interpreted. The attribute/value prompt cycle is now repeated until the operator declares that the last attribute and its value has been entered by depressing some keyboard key such as the ENTER key. The application returns to the prompt for entity content which is the next entity to be selected after "Begin Document".

If after "Begin Document" an entity for a structured field group is selected such as Master Environment Group, then the menu is properly adjusted to reflect the fact that two structured field groupings are now open, "Document" and "Master Environment" groups. There is no limit to the number of structured field group entities that can be open at any one time except that imposed by the architecture from which the function set is being drawn. As the operator selects or enters answers to prompts, application 13 fills in the function set shell. When the operator has completed, application 13 saves the Function Set Description Table in permanent storage which may be local to the device in which the application is running, such as direct access storage device (DASD) 17, or in a non-local system or network storage facility 18.

Figure 4:
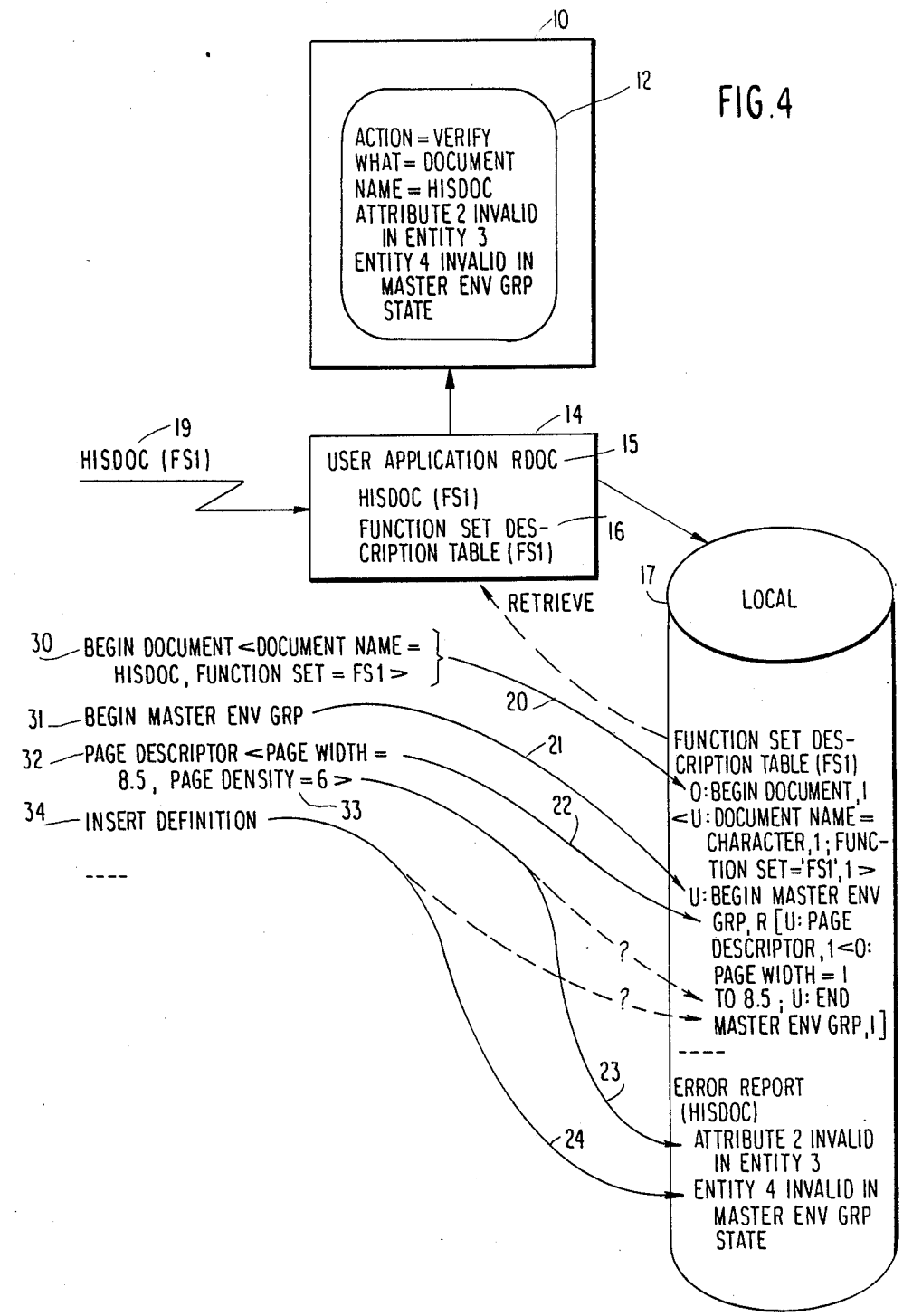
FIG. 4 is a block diagram illustrating the workstation of FIG. 2 showing a document containing an attribute in its structured field which identifies the function set used to generate its content.

In FIG. 4, document 19 "HISDOC" is received at device 14. Document 19 contains an attribute in its "Begin Document" structured field which identifies the function set that was used to generate its content. The function set attribute's value is "FS1". The operator of device 14 wishes to verify that "HISDOC" is validly constructed. Therefore, the operator activates the application 15 which searches "HISDOC" and determines from the function set attribute on "Begin Document" that "HISDOC" has declared that it conforms to function set "FS1". Application 15 then retrieves from local permanent storage 17 Function Set Description Table 16 named "FS1". Note that if "FS1" was not found in local permanent storage, a request to retrieve it from remote permanent storage 18 would be issued. The result is that the Function Set Description Table named "FS1" is loaded into device 14 along with the received document "HISDOC". Application 15 verifies that "HISDOC" is constructed properly. In FIG. 4, arrows 20, 21, and 22 show that the elements 30, 31 and 32 in "HISDOC" are valid. Arrows 24 and 25 show that elements 34 and 33 are not valid. Arrows 24 and 25 show that elements 34 and 33 have caused application 15 to generate an error report which is reported to the operator on screen 10 and saved in local secondary storage. The operator is now aware that "HISDOC" does not conform to function set "FS1" and which elements of "HISDOC" are the nonconforming elements.

Figure 5:
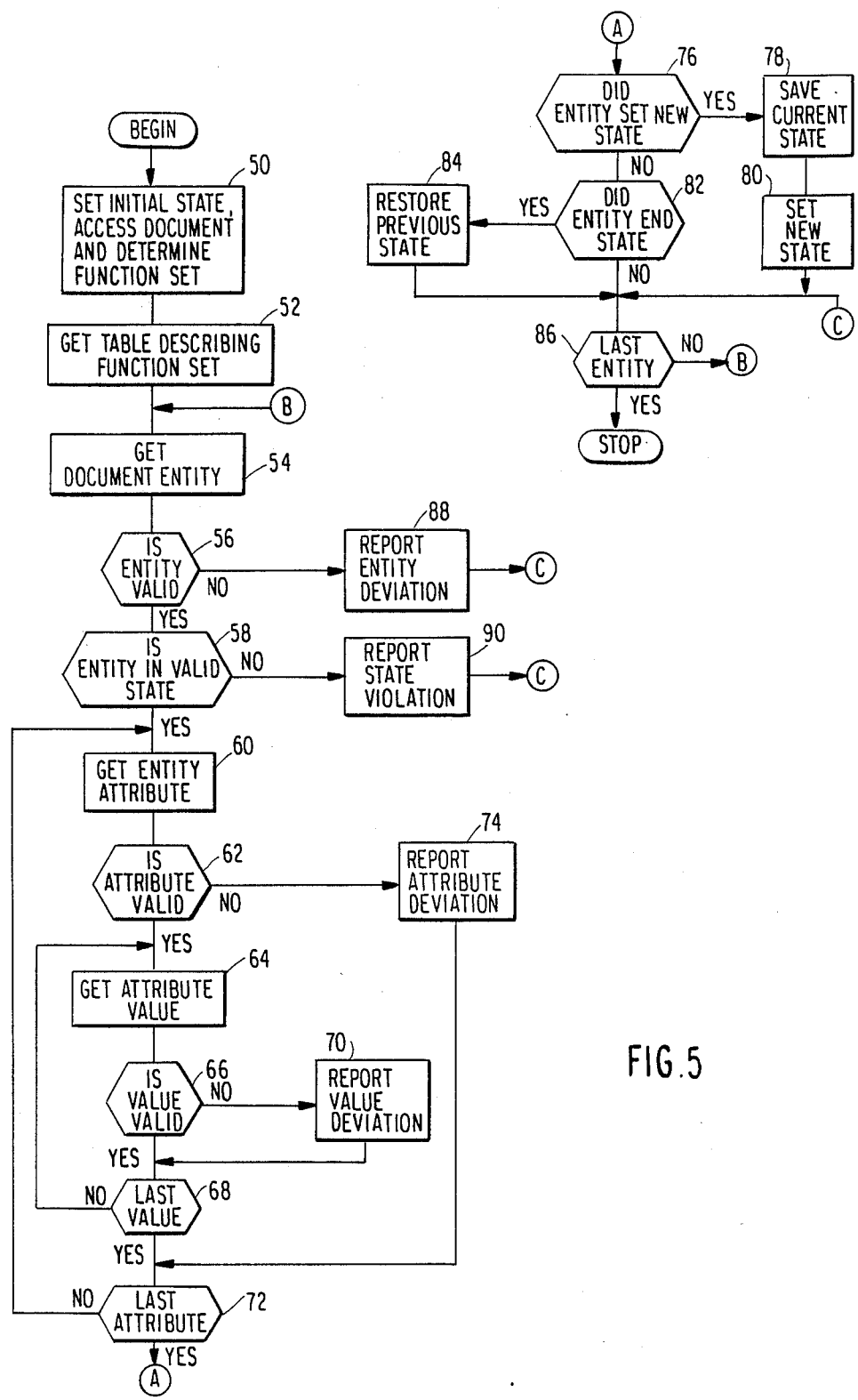
FIG. 5 is a flow diagram showing the logic of the software used to implement the invention.

The logic of the process according to the invention is illustrated in more detail in the flow diagram shown in FIG. 5. The process begins at function block 50 where the initial state is set, the document is accessed and the function set is determined. Next, in function block 52, the table describing the function set is retrieved and then, in function block 54, the document entity is retrieved. A test is then made in decision block 56 to determine if the entity is valid and, if valid, a subsequent test is made in decision block 58 to determine if the entity in a valid state. If so, the entity attribute is retrieved in function block 60, and a test is made in decision block 62 to determine if the attribute is valid. If so, the attribute value is retrieved in function block 64, and a test is made in decision block 66 to determine if the attribute value is valid. If so, a test is made in decision block 68 to determine if the tested value was the last value. If not, control loops back to function block 64, and the next attribute value is retrieved and tested for valid. Should an attribute value be found not valid at decision block 66, a report of the value deviation is made in function block 70 before control goes to decision block 68. When the last value has been tested, a test is made in decision block 72 to determine if the last attribute has been retrieved and tested. If not, control loops back to function block 60 to retrieve and test the next entity attribute. If the attribute is found not to be valid in decision block 62, a report of the attribute is made in function block 74 before control goes to decision block 72.

When the last attribute is found in decision block 72 control goes, via connector A, to decision block 76 where a test is made to determine if the entity set a new state. If so, the current state is saved in function block 78, and then the new state is set in function block 80; otherwise, a test is made in decision block 82 to determine if the entity ended the state. If so, the previous state is restored in function block 84; otherwise, control goes directly to decision block 86 where at test is made to determine if the last entity has been processed. Control also passes to decision block 86 from function blocks 80 and 84. A negative result of the tests in decision blocks 56 and 58 result in a report of entity deviation or state violation in function blocks 88 and 90 before control passes to decision block 86 via connector C. If the test in decision block 86 is negative, that is the last entity has not been processed, control then loops back to function block 54, via connector B, to retrieve the next document entity; otherwise, the process stops.

The following pseudocode, written in Program Design Language (PDL), implements the logic shown in the flow diagram of FIG. 5. A skilled programmer can write source code in any desired programming language from the pseudocode from which object code may be derived by a suitable compiler.

```
SET <Document_State> TO <Initial_State>
SET <Entity_Count> TO 1
SET <W> TO <Value_Count>
SET <X> TO <Entity_Count>
SET <Y> TO <Document_State>
SET <Z> TO <Attribute_Count>
GET <Document_Name>
FIND <Function_Set_Declaration, Function_Set_Name>
GET <Table, Function_Set_Name>
REPEAT
  SET <Attribute_Count> TO <1>
  GET NEXT <Document_Entity>
  GET <Table_Valid_Entity_Definition>
  If <Document_Entity> IS NOT IN <Table_Valid_Entity_Definition> THEN
    WRITE <"Entity X Invalid in Y State">
  ELSE DO
    GET <Table_State>
    IF <State> IS NOT EQUAL TO <Table_State>
      WRITE <Entity X in Invalid State Y>
    ELSE DO
      REPEAT
        SET <Value_Count> TO <1>
        GET NEXT <Entity_Attribute>
        GET <Table_Entity_Attributes_Definition>
        IF <Entity_Attribute> IS NOT IN <Table_Entity_Attributes_Definition> THEN
          WRITE <"Attribute Z Invalid in Entity X">
        ELSE DO
          GET NEXT <Entity_Value>
          GET <Table_Attribute_Values_Definition>
          IF <Attribute_Value> IS NOT IN <Table_Attribute_Values_Definition> THEN
          END DO
        UNTIL VALUES COMPLETED
      END DO
      UNTIL ATTRIBUTES COMPLETED
      If <Entity> SETS <Begin_State> THEN DO
        SAVE <Document_State, State_Save_Stack>
        SET <Document_State, Begin_State>
      END DO
      IF <Entity> SETS <End_State> THEN
        SET <Document_State, State_Save_Stack>
      END DO
UNTIL ENTITIES COMPLETED
STOP
```

In summary, among the advantages of the invention includes the ability of an application acting as a general purpose compound document data stream verifier to determine if a compound document conforms to a specified architecture function set. The application verifier can be general purpose and independent of the function set defined, documents created, and generators that create the documents.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A process for verifying if a compound document data stream conforms to a specified architecture function set comprising the steps performed by a computer of:

creating an architecture function set description for a compound document;

testing values of said data stream to determine if the values conform with said function set description; and generating a report of each value deviation from said function set description.

2. The process for verifying as recited in claim 1 further comprising the steps of:

storing said function set description for the compound document data stream in a table; and retrieving the function set description from said table prior to said testing step.

3. The process for verifying as recited in claim 1 wherein the values tested in said testing step are entities, entity attributes and attribute values and the report generated in said generating step provides the deviation of each entity, entity attribute and attribute value from said function set description.

4. The process for verifying as recited in claim 1 wherein the values tested in said testing step are entities, entity attributes and attribute values and the report generated in said generating step provides the deviation of each entity, entity attribute and attribute value from said function set description, further comprising the steps of:

storing said function set description of the entities, entity attributes and attribute values for the compound document data stream in a table; and retrieving the function set description of the entities, entity attributes and attribute values from said table prior to said testing step.

5. The process for verifying as recited in claim 1 further including the step of creating a function set description table comprising function set attribute values and wherein the step of testing is performed by testing attribute values in said data stream to determine if specified attribute values conform with the function set attribute valves specified in said table.

6. The process for verifying as recited in claim 1 further comprising:

specifying the function set description of a compound document as a resource;

storing said resource separately from the compound document; and transmitting said resource to interchange and verify compound documents which conform to the same architecture function set thereby reducing a number of transmissions and a number of bytes transmitted.

7. The process for verifying as recited in claim 1 further comprising:

specifying the function set description of a compound document as a resource;

storing said resource separately from the compound document; and sharing said resource among several documents thereby reducing a number of bytes required to store the function set definition.

8. The process for verifying as recited in claim 1 wherein said architecture function set is created separately from said compound document.

* * * * *